United States Patent [19]

Alessio

[11] 4,032,203
[45] June 28, 1977

[54] BEARING ARRANGEMENT FOR THE ARMATURE SHAFT OF AN ELECTRIC MOTOR

[75] Inventor: Lorenzo Ercole Alessio, Lecco, Italy

[73] Assignee: The Black and Decker Manufacturing Company, Towson, Md.

[22] Filed: June 2, 1976

[21] Appl. No.: 692,213

[30] Foreign Application Priority Data

June 10, 1975 Italy .................... 24222/75

[52] U.S. Cl. .................................. 308/72
[51] Int. Cl.² .............................. F16C 23/00
[58] Field of Search .......... 308/158, 176, 219, 233, 308/234, 72, 140

[56] References Cited

UNITED STATES PATENTS

| 3,002,794 | 10/1961 | Bluemink | 308/163 X |
| 3,363,950 | 1/1968 | Cole | 308/163 X |
| 3,649,092 | 3/1972 | Coleman | 308/72 |

Primary Examiner—Joseph F. Peters, Jr.
Assistant Examiner—Gene A. Church
Attorney, Agent, or Firm—Walter Ottesen; Edward D. Murphy; Leonard Bloom

[57] ABSTRACT

The invention is directed to a bearing arrangement for the shaft of the armature of an electric motor disposed in a support frame and subject to axial thrust. The bearing arrangement includes a bearing housing disposed so as to receive an end portion of the shaft therein and defining a bearing wall for receiving the axial thrust of the shaft. The bearing housing has a structure formed thereon for mounting the bearing housing to the support frame. A bearing at the interface of the bearing wall and the end portion transmits the axial thrust of the shaft to the bearing wall. A shaft bearing rotatably engages the end portion of the shaft and elastic material interposed between the structure and the support frame deforms elastically in response to the axial thrust applied to the bearing wall. The mounting structure is located with respect to the shaft axially back of the end of the end portion and the bearing wall is disposed axially beyond the mounting structure and the end portion so that the axial thrust of the shaft against the bearing wall will cause the bearing housing to center itself with respect to the axial thrust thereby taking up misalignment of the shaft relative to the shaft bearing.

9 Claims, 3 Drawing Figures

U.S. Patent     June 28, 1977     4,032,203
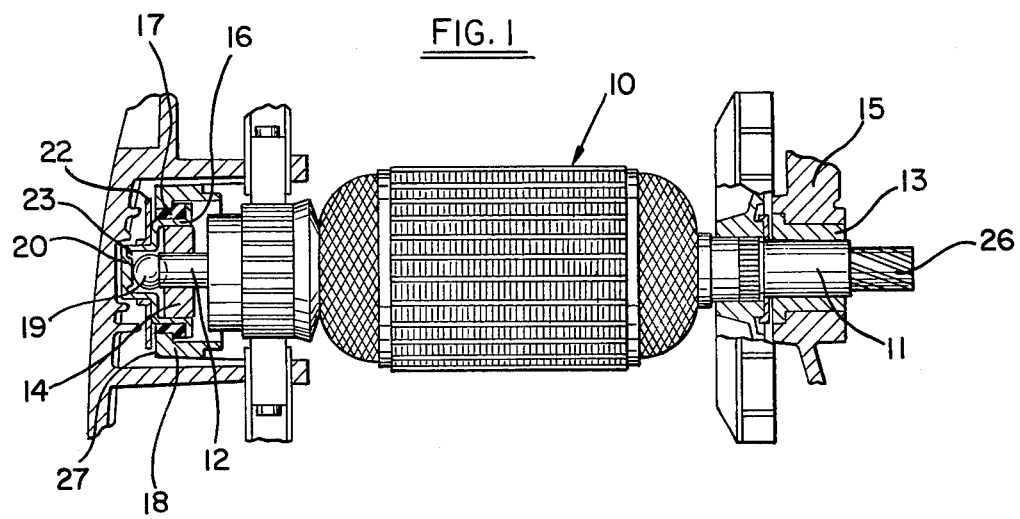
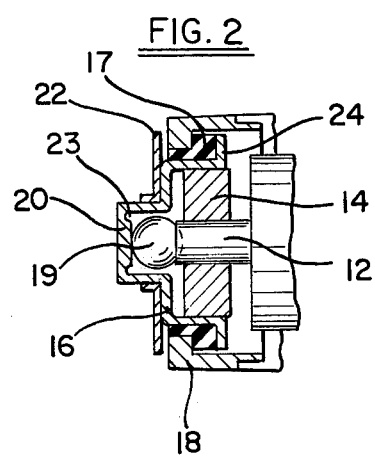 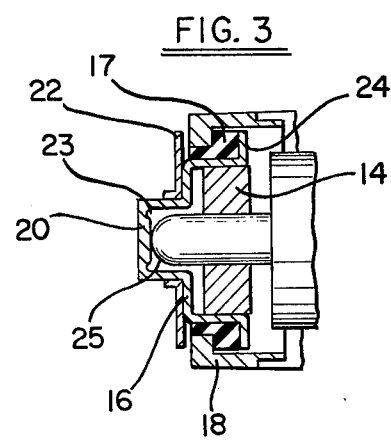

BEARING ARRANGEMENT FOR THE ARMATURE SHAFT OF AN ELECTRIC MOTOR

BACKGROUND OF THE INVENTION

The invention relates to a bearing arrangement for the armature shaft of an electric motor mounted in a support frame. The bearing arrangement according to the invention is especially applicable to electric motors mounted in portable electric tools such as drills and the like.

In tools of this type, the supporting forces of the armature shaft act directly against the bearing surface of the sleeve bearing engaging the shaft. This contact is on a very large area and because of a misalignment of the shaft with respect to the sleeve bearing, friction occurs which generates a great quantity of heat that is generally dispersed through the supporting structure. However, such operating inevitably reduces the efficiency of the motor substantially.

It is known that the support for receiving the thrust can be arranged at the end of the armature shaft and that the thrust can act on a spherical component mounted on the rotational axis of the armature shaft. However, in the known arrangement, it is very difficult to maintain the co-axial alignment of the sphere with the axis of rotation of the shaft and this results in lateral forces acting on the sleeve bearing. Such lateral forces develop when there is a misaligment between the sleeve bearing and the shaft.

SUMMARY OF THE INVENTION

Accordingly, it is an object of our invention to provide a bearing arrangement wherein the bearing surface of the sleeve bearing upon which the shaft acts is maintained in substantial alignment wih the shaft.

It is still another object of our invention to provide a bearing arrangement wherein a good bearing surface is provided to receive the axial thrust of the armature shaft.

The bearing arrangement according to a preferred embodiment of the invention supports an end portion of the armature shaft such that the end portion rotates inside a sleeve bearing arranged in a bearing housing. The end portion of the shaft reacts with a spherical bearing which is interposed between the sleeve bearing and a bearing wall defined by the bearing housing in such a manner that the alignment of the spherical bearing and the sleeve bearing are interdependent.

The bearing arrangement of the invention supports the shaft of the armature of an electric motor and is disposed in a support frame of a portable tool for example. The armature and shaft are subject to axial thrust. According to a feature of the invention, a bearing housing is disposed so as to receive an end portion of the shaft therein and defines a bearing wall for receiving the axial thrust of the shaft. The bearing housing has structure formed thereon for mounting the bearing housing to the support frame. A bearing at the interface of the bearing wall and the end portion of the shaft transmits the axial thrust of the shaft to the bearing wall. A sleeve bearing rotatably engages the end portion of the shaft and elastic material interposed between the structure and the support frame deforms elastically in response to the axial thrust applied to the bearing wall. The structure is located with respect to the shaft axially back of the end of the end portion and the bearing wall is disposed axially beyond the structure and the end portion so that the axial thrust of the shaft against the bearing wall will cause the bearing housing to center itself with respect to the axial thrust thereby taking up misalignment of the shaft relative to the sleeve bearing.

The above objectives and advantages of my invention will become more apparent from a consideration of the detailed description to follow taken in conjunction with the drawing annexed hereto.

BRIEF DESCRIPTION OF THE DRAWING

FIG.1 is an elevation view, partially in section, of the bearing arrangement according to the invention for mounting the armature shaft of an electric motor.

FIG. 2 is an exploded fragmentary view showing the end portion of the shaft engaging a spherical bearing disposed between the end of the armature shaft and the bearing wall defined by the bearing housing.

FIG. 3 is an exploded fragmentary view showing the end portion of the shaft formed to define a bearing surface.

DESCRIPTION OF THE PREFERRED EMBODIMENTS OF THE INVENTION

Referring to FIG. 1, reference numral 10 indicates the armature shaft of an electric motor generally used in portable electric tools. The armature 10 is shown dirivng helicaal gears 26.

The armature 10 has a shaft that is rotatably supported at end portions 11 and 12 by two sleeve bearings 12 and 14, respectively. The sleeve bearing 13 is covered by the ear cup 15; whereas, the sleeve bearing 14 is arranged in a bearing housing 16 mounted at the end 18 of the tool. The bearing housing 16 is anchored at 18 with aid of interposed elastic means in the form of an elastic gasket 17. The end portion 12 of the armature shaft reacts though a spherical member 19 against the wall 21 of the recess 20 of the bearing housing 16.

A washer-like member 22 is forced over the bearing housing for the double purpose of eliminating heat and keeping the bearing housing 12 in the correct position during assembly of the bearing arrangement.

Also, the washer-like member 22 will retain the bearing arrangement in the frame of the tool when the armature 10 is withdrawn by engaging the back end 27 of support frame 18.

The bearing arrangement of this invention compensates for a misalignment between bearings 13 and 14 which can result, for example, during assembly of the tool. The bearing arrangement of the invention further avoids misalignment between the armature shaft and the thrust bearing system because the sleeve bearing 14 and the sphere 19 are both mounted in the same bearing housing 16 and the bearing housing 16 is elastically mounted on the support frame 18.

The axial thrust which acts on the ball 19 acts through the bearing housing 6 on the elastic gasket 17 and, by distortion of gasket 17, brings the end wall 20 of the recess 23 of the bearing housing 16 into a position perpendicular to the directon of the axial thrust component of the armature 10 thereby aligning the sleeve bearing 14 with respect to the shaft end portion 12 as well as with the sleeve bearing 13 at the other end of the armature 10.

With the mounting arrangement of the invention, the thrust of the armature therefore is prevented from reacting unfavorably against the sleeve bearing 14 and the ball 19 and sleeve bearing 14 are coaxially aligned.

Referring now to FIG. 2, it is noted that the bearing housing has a flange structure 24 formed thereon for mounting the bearing housing 16 to the support frame 18. Elastic means in the form of an elastic material 17 is interposed between this flange structure 24 and the support frame 18 for deforming elastically in response to the axial thrust applied by the shaft end portion 12 against the bearing wall 20 of the bearing housing through the ball 19. The flange structure 24 is located with respect to the shaft end portion 12 axially back of the end-face of the shaft end portion 12 and the bearing wall 20 is disposed axially beyond the structure and the end portion 12. Because of this location of the bearing wall 20 vis-a-vie the flange structure 24, the axial thrust of the shaft against the bearing wall 20 acts thereon also at a point beyond the mounting location at flange 24 thereby causing the bearing housing 16 to center itself with respect to the axial thrust directed along the shaft axis; this centering action is made possible by the elastic material 17 which will deform to take up a misalignment of the shaft relative to the sleeve bearing 14 and a misalignment between the sleeve bearings 13 and 14 at respective ends of the armature 10. The shaft bearings 13 and 14 need not be sleeve bearings but could, instead, be needle bearings.

A small recess is formed in the end-face of the end portion 12 of the shaft for accommodating the bearing 19 thereby assuring that the thrust will act to keep the spherical bearing aligned with the sleeve bearing 14.

According to another embodiment of the invention, the ball 19 is made substantially larger than the inner diameter of the bearing sleeve 14 thereby providing a substantially large surface upon which the shaft 12 can bear. This configuration affords the further advantage that the ball 19 can not be lost when the shaft is withdrawn from the bearing arrangement because the ball will not be able to roll out through the sleeve bearing 14.

According to still another embodiment of the invention, and referring to FIG. 3, the shaft end portion 12 can be rounded to define a bearing surface 25.

It should be noted, that my invention is not only limited to a bearing arrangment for the armature of an electric motor, but could be used, for example, in a gear arrangement where it is desirable to compensate for a misalignment between two bearings holding a gear shaft. By utilizing the bearing arrangement according to the invention at one end of the shaft, the bearing of said arrangement will correct center its position so that bearings at respective ends of the shaft will be in alignement with respect to each other.

I claim:

1. A bearing arrangement for the shaft of the armature of an electric motor disposed in a support frame and subject to axial thrust comprising:
   a bearing housing disposed so as to receive an end portion of the shaft therein and defining a bearing wall for receiving the axial thrust of said shaft, said bearing housing having structure formed thereon for mounting said bearing housing to the support frame;
   bearing means at the interface of said bearing wall and said end portion for transmitting the axial thrust of the shaft to said bearing wall;
   shaft bearing means for rotatably engaging said end portion;
   elastic means interposed between said structure and said support frame for deforming elastically in response to the axial thrust applied to said bearing wall; and,
   said structure being located with respect to said shaft axially back of the end of said end portion and said bearing wall being disposed axially beyond said structure and said end portion so that the axial thrust of the shaft against said bearing wall will cause the bearing housing to deform said elastic means to thereby center itself with respect to said axial thrust thereby taking up misalignment of the shaft relative to said shaft bearing means.

2. The bearing arrangement of claim 1, comprising a washer-like member fitted onto said bearing housing for dissipating heat generated in said bearing housing.

3. The bearing aligment of claim 1 wherein said bearing means comprises a spherical bearing disposed between said pressure wall and the end surface of said end portion and wherein said sleeve bearing means comprises a sleeve bearing rotatably engaging said end portion.

4. The bearing arrangement of claim 3, said spherical bearing having a diameter greater than the inner diameter of said sleeve bearing.

5. The bearing arrangement of claim 4 comprising a washer-like member fitted onto said bearing housing for dissipating heat generated in said bearing housing.

6. The bearing arrangement of claim 1 wherein said end-portion of the shaft is formed to define a rounded bearing surface for engaging said bearing wall.

7. In a portable electric tool having a housing frame, an electric motor having an armature rotatably mounted in the housing frame and subjectable to axial thrust, and a bearing arrangement for the shaft comprising:
   a bearing housing disposed so as to receive an end portion of the shaft therein and defining a bearing wall for receiving the axial thrust of said shaft, said bearing housing having structure formed thereon for mounting said bearing housing to the housing frame;
   bearing means at the interface of said bearing wall and said end portion for transmitting the axial thrust of the shaft to said bearing wall;
   sleeve bearing means for rotatably engaging said end portion;
   elastic means interposed between said structure and said housing frame for deforming elastically in respone to the axial thrust applied to said bearing wall; and,
   said structure being located with respect to said shaft axially back of the end of said end portion and said bearing wall being disposed axially beyond said structure and said end portion so that the axial thrust of the shaft against said bearing wall will cause the bearing housing to deform said elastic means to thereby center itself with respect to said axial thrust thereby taking up any lateral misalignment of the shaft relative to said sleeve bearing means.

8. A bearing arrangement for the shaft of the armature of an electric motor disposed in a support frame and subject to axial and lateral loading comprising:
   a bearing housing mounted in the frame and disposed so as to receive an end portion of the shaft therein;
   a sleeve bearing mounted in said bearing housing for rotatably engaging said end portion; and,
   elastic means interposed between said housing and the frame for deforming elastically to take up any misalignment of the armature shaft with respect to said sleeve bearing.

9. A bearing arrangement for a shaft rotatably mounted in shaft bearings arranged at respective end portions of the shaft and subject to axial thrust, the bearings being arranged in a support frame, the bearing arrangement comprising:

a bearing housing disposed so as to receive an end portion of the shaft therein and defining a bearing wall for receiving the axial thrust of said shaft, said bearing housing having structure formed thereon for mounting said bearing housing to the support frame;

bearing means at the interface of said bearing wall and said end portion for transmitting the axial thrust of the shaft to said bearing wall;

one of said shaft bearings being mounted in said bearing housing for rotatably engaging said end portion;

elastic means interposed between said structure and said support frame for deforming elastically in response to the axial thrust applied to said bearing wall; and, said structure being located with respect to said shaft axially back of the end of said end portion and said bearing wall being disposed axially beyond said structure and said end portion so that the axial thrust of the shaft against said bearing wall will cause the bearing housing to deform said elastic means to thereby center itself with respect to said axial thrust thereby taking up a misalignment between said shaft bearings.

* * * * *